United States Patent
Karasaki

(10) Patent No.: US 7,260,839 B2
(45) Date of Patent: Aug. 21, 2007

(54) SYSTEM AND METHOD FOR SECURE WALL

(75) Inventor: Teiji Karasaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 10/610,758

(22) Filed: Jul. 2, 2003

(65) Prior Publication Data

US 2004/0039944 A1 Feb. 26, 2004

(30) Foreign Application Priority Data

Jul. 8, 2002 (JP) ............................ 2002-198102

(51) Int. Cl.
*H04L 29/00* (2006.01)
(52) U.S. Cl. .......................................... 726/11; 726/24
(58) Field of Classification Search ................. 726/11, 726/24
See application file for complete search history.

(56) References Cited

U.S. PATENT DOCUMENTS

| | | | |
|---|---|---|---|
| 5,664,098 A * | 9/1997 | Bianchi et al. | 726/16 |
| 6,199,181 B1 * | 3/2001 | Rechef et al. | 714/38 |
| 2004/0054886 A1 * | 3/2004 | Dickinson et al. | 713/153 |

FOREIGN PATENT DOCUMENTS

| | | |
|---|---|---|
| JP | 2001014239 | 1/2001 |
| JP | 2001101021 | 4/2001 |
| JP | 2001337864 | 12/2001 |

OTHER PUBLICATIONS

"Broadband Router with Complete Anti-virus Capabilities", PCfan vol. 9, No. 8, Mar. 15, 2002, p. 62.

* cited by examiner

*Primary Examiner*—Kambiz Zand
*Assistant Examiner*—Andrew L Nalven
(74) *Attorney, Agent, or Firm*—Mattingly, Stanger, Malur & Brundidge, P.C.

(57) ABSTRACT

A security wall, such as a firewall and a viruswall, is built easily which does not require firewall-dedicated hardware or viruswall-dedicated hardware nor, in a mobile information processing device, mobile terminal-dedicated hardware. For this purpose, on a single information processing device, a plurality of separate LAN segments are realized and data from an external network such as the Internet is forced to pass through the multiple LAN segments before it reaches a user system in order to reinforce the system against external attacks. The security wall system is made portable so that the firewall and the viruswall can be executed at the same time, strengthening the security of the mobile information processing device.

4 Claims, 5 Drawing Sheets

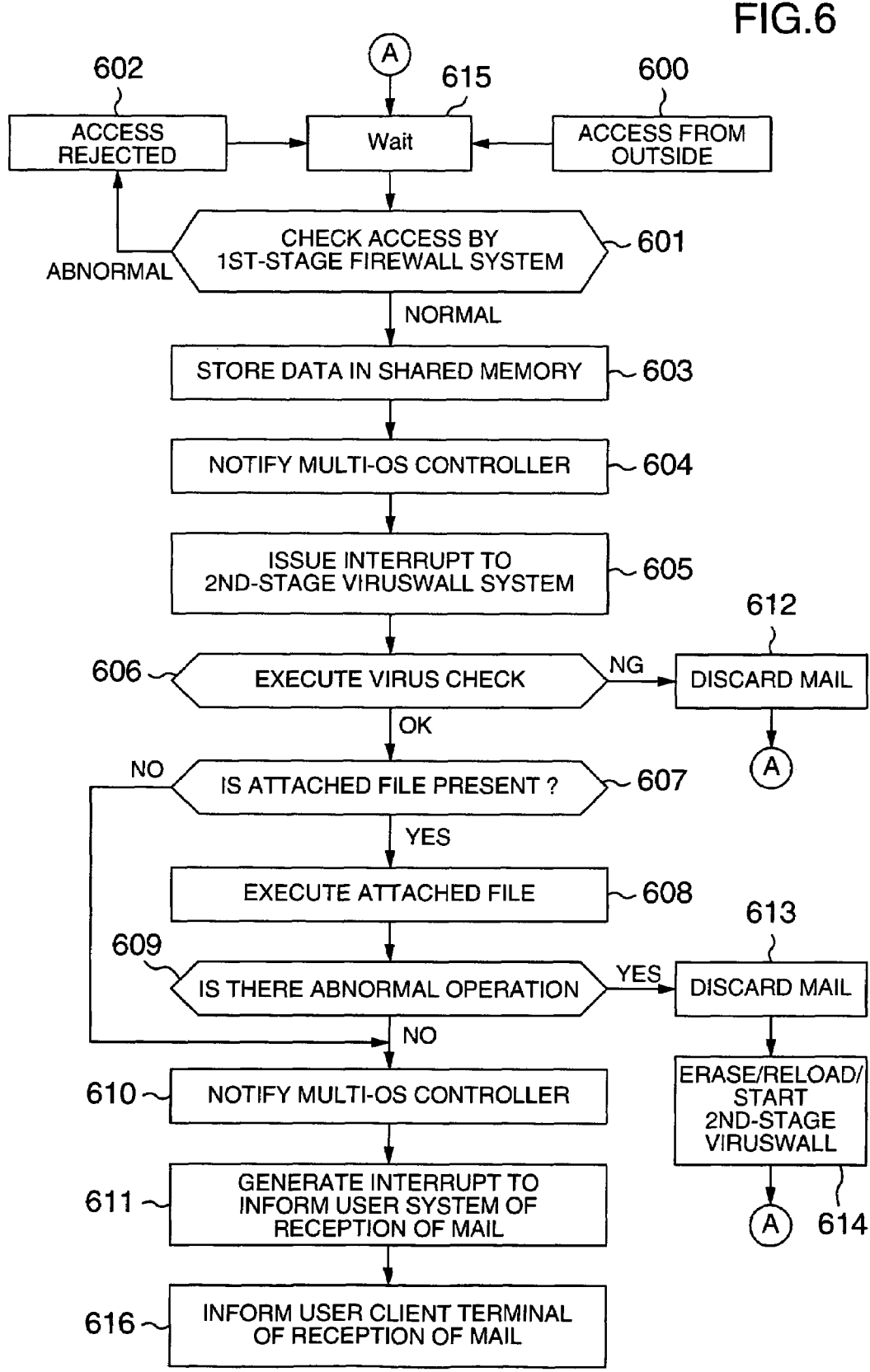

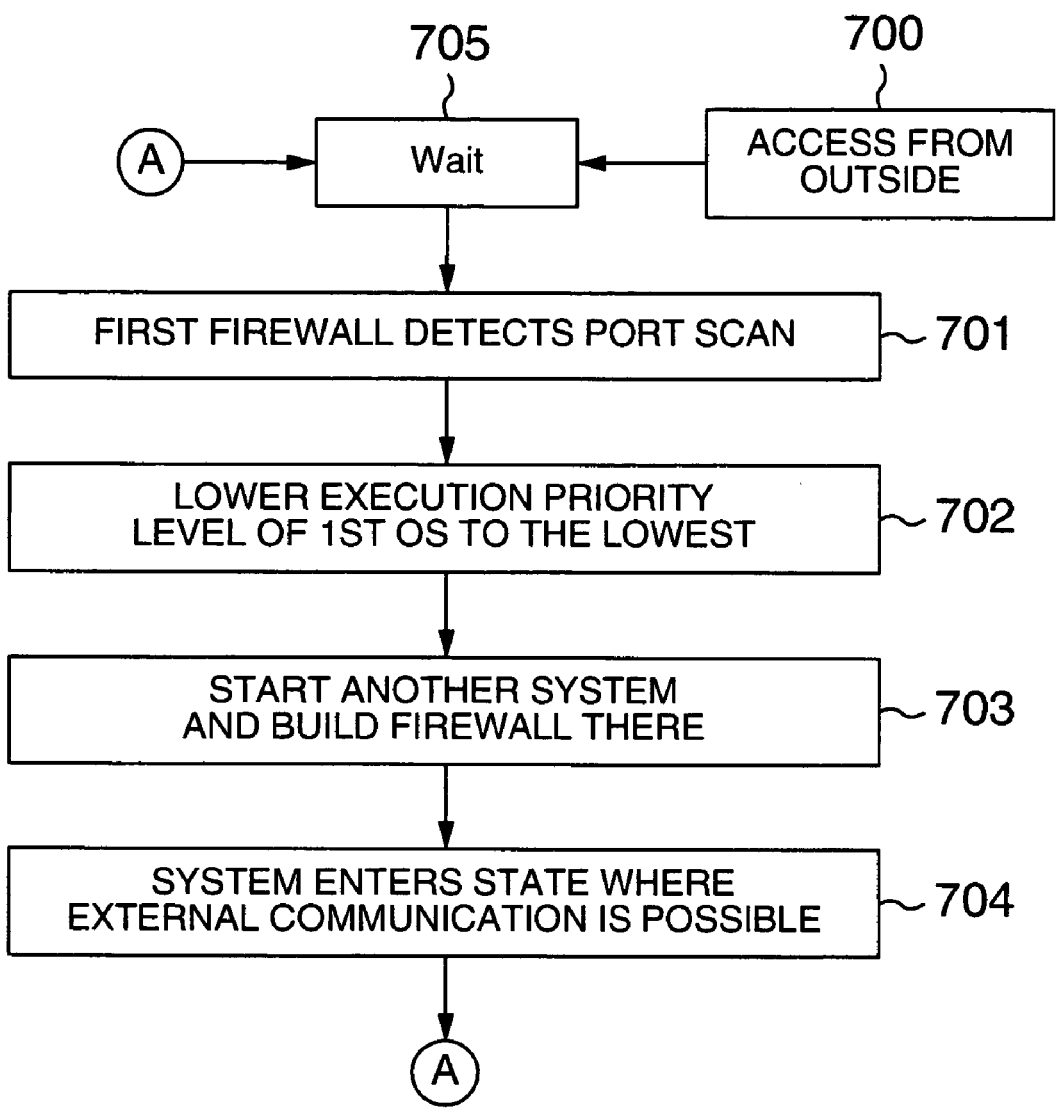

SYSTEM AND METHOD FOR SECURE WALL

BACKGROUND OF THE INVENTION

The present invention relates to a security wall system in an information processing system and more particularly to a security wall system for protecting user systems against unauthorized accesses via networks and attacks using computer viruses.

With the ever-widening prevalence of the Internet, protection against attacks on corporate systems via the Internet and against reception of mails implanted with viruses has gained an increasing importance. It is also important for low-cost servers to be able to protect systems efficiently against attacks via the Internet without adding special hardware and, as mobile client terminals are coming into wide use in recent years, to provide these terminals with security with a reasonable cost performance.

FIG. 2 illustrates connections of a corporate network using conventional technologies. FIG. 3 illustrates how a mobile terminal is connected to a network. In conventional technologies, when a user system 201 is connected to an external communication network 200 such as the Internet through a LAN, a front end device such as a firewall server 202 is situated in front of the user system 201 (Web server 204, mail server 205, etc.), as shown in FIG. 2, to prevent an inundation of unsolicited packets from the external network 200 (e.g., the Internet), a tampering of files and an infiltration of computer viruses.

SUMMARY OF THE INVENTION

A user needs to purchase and install, in addition to an intended user system 201, as many sets of hardware or front end devices, including firewall servers 202 and viruswall servers 203, as security walls. Further, if the security such as a firewall server 202 should be broken, the user system (Web server 204, mail server 205, etc.) will sustain catastrophic damages, such as performance degradation and file destruction.

Further, the mobile terminal 304, as shown in FIG. 3, connects to a server group (FTP (File Transfer Protocol) server 301, Web server 302, etc.) via a service provider 303 without using a front end device such as firewall server 202. In this case, while the server side (a group of servers in the user system 201) is provided with a firewall server 305, the mobile terminal 304 as a user system 201A is directly connected to a network 300 such as the Internet, so that the mobile terminal 304 is not protected against attacks from outside.

As described earlier, in the conventional technologies there is a problem that as many sets of hardware as the security walls need to be purchased and installed. If the security wall should be broken, the user system will be directly exposed to attacks. Further, when a mobile terminal away from home or office is to be connected to an open network such as the Internet, the connection is not protected by a security wall and the mobile terminal is vulnerable to external attacks.

It is therefore an object of the present invention to solve these problems experienced with the conventional technologies and provide a security wall system and a program for the same which do not need firewall-dedicated hardware nor mobile terminal-dedicated hardware; which can block unauthorized accesses that have infiltrated through the firewall of the front end system and prevent viruses from being embedded in the system and a tempering of DK data; and which can also protect the user system from attacks that take advantage of weak points of a particular operating system.

The security wall system of this invention comprises: a plurality of operating systems configured on an information processing device so that only a front end system can be seen from outside; a plurality of LAN boards through which data from a network passes before reaching a user system; a multi-OS control program which, when a mail arrives from the network, receives a control via the LAN board and transfers the control to a firewall program running on the first operating system, wherein the firewall program checks whether an access is valid and, if the access is found invalid, rejects the access and enters an access wait state, wherein if the access is found valid, the firewall program transfers the control to the second operating system to cause a virus check program running on the second operating system to perform a virus check; a shared memory to temporarily store received data when the access validity check and virus check performed by the multiple operating systems find that the received data is normal; and a user terminal connected via one of the LAN boards to the user system and controlled by the operating system running on the user system.

The security protection program of this invention realizes a plurality of separate LAN segments in one and the same information processing device and forces received data from an external network such as the Internet to pass through these multiple LAN segments before it reaches the user system, thereby augmenting the protection against external attacks. If one of the LAN segments is attacked and infiltrated, this arrangement prevents damages from affecting the user system. Further, provisions are made to allow the firewall and the viruswall to run simultaneously, and the firewall and viruswall programs are made portable strengthen the security of the mobile information processing device. To build multiple LAN segments on one and the same hardware and to allow the firewall, the viruswall and the user system to run on the same hardware, a plurality of operating systems are arranged to be able to run independently at the same time on one and the same hardware.

Other objects, features and advantages of the invention will become apparent from the following description of the embodiments of the invention taken in conjunction with the accompanying drawings.

BRIEF DESCRIPTION OF THE DRAWINGS

FIG. 6 is a flow chart for checking mails for virus infection in this embodiment.

FIG. 7 is a flow chart of an operation performed when the system is port scan-attacked from outside.

DESCRIPTION OF THE EMBODIMENTS

Now, one embodiment of the present invention will be described by referring to the accompanying drawings and operation flow charts.

Figure 1:
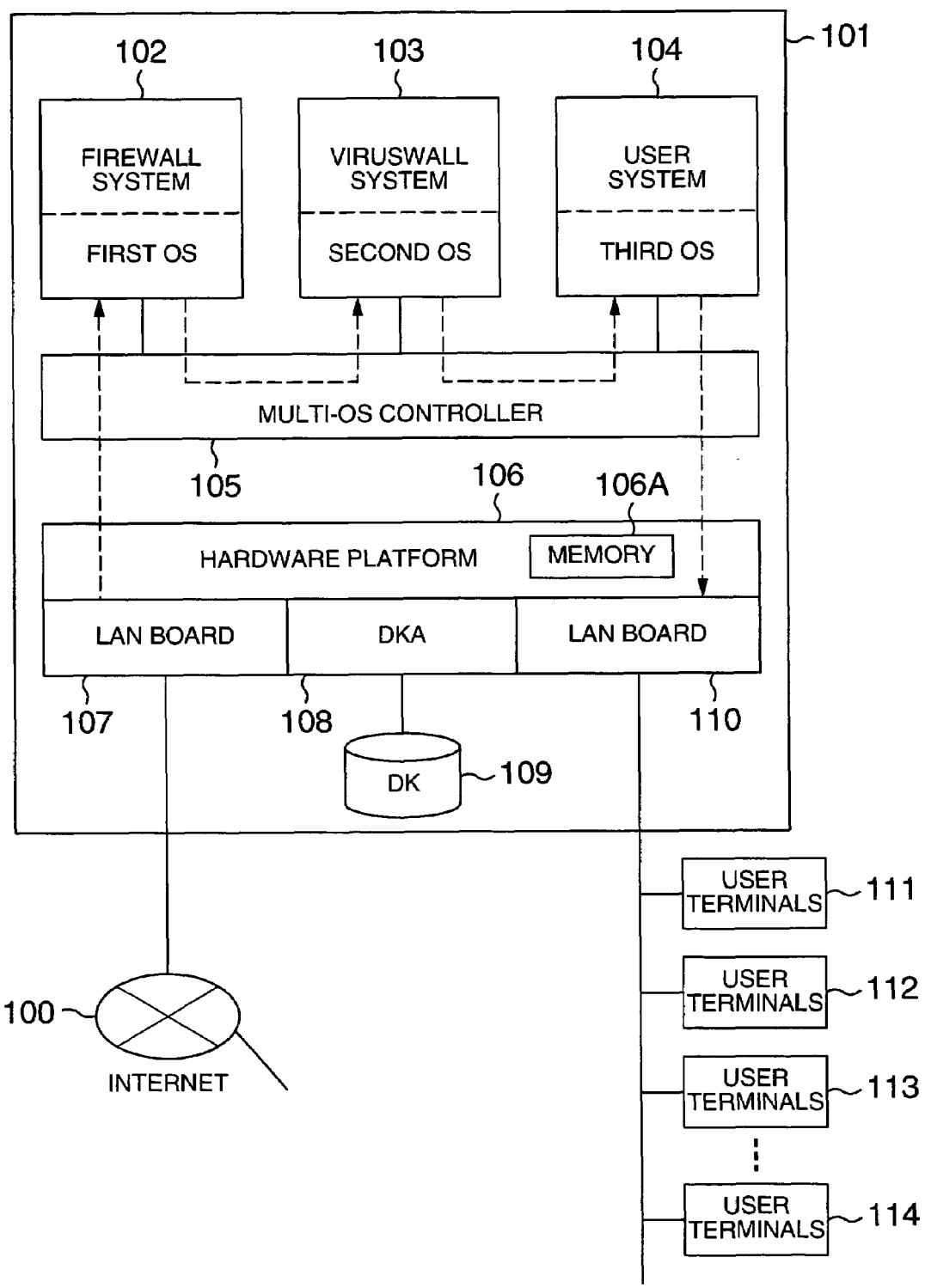
FIG. 1 is a schematic diagram showing an overall configuration of a security wall system as one embodiment of the present invention.

FIG. 1 shows an overall configuration of the security wall system as one embodiment of the invention. The security wall system of this invention in an information processing device 101 comprises a firewall system 102 managed by a first operating system, a viruswall system 103 managed by a second operating system, a user system 104 managed by a third operating system, a multi-OS control program 105 connected to these three systems, a hardware platform 106 incorporating a shared memory 106A, a LAN board 107, a disk control adapter (DKA) 108 and a LAN board 110, all three divided from each other and subordinate to the hardware platform 106, a disk unit 109 connected to the DKA 108, and user terminals 111-114 connected to the LAN board 110. The LAN board 107 is connected to the Internet 100.

In this invention, multiple operating systems are run on single hardware and provisions are made to ensure that only the front end system can be seen from outside and that an access from the outside is passed through an internal virtual LAN segment to the second system, i.e., the viruswall system 103, where an authority of the access is checked before an affixed file is opened and executed. After the access is found to be an authorized one, the data is transferred through another virtual LAN segment to the user system 111-114. This process blocks unauthorized accesses that have infiltrated through the firewall of the front end system, and thereby prevents an infiltration of viruses and a file tampering on disks. Since the firewall system 102, viruswall system 103 and user system 104 can be operated on one and the same hardware, there is no need to install firewall-dedicated hardware nor viruswall-dedicated hardware. Also in the mobile terminals, dedicated hardware is not required.

FIG. 6 is a flow chart for a virus check performed when an access is made from an external network to a mail server. In FIG. 1, if the user system 104 is a mail server, how a mail received from outside reaches the user client terminals 111-114 will be explained by referring to the flow chart of FIG. 6 and a system configuration of FIG. 1. In a wait state where no mail is received (step 615), when a mail is received from outside through the Internet 100 (step 600), a control is transferred from the LAN board 107 via the hardware platform 106 such as CPU to the multi-OS control program 105 (referred to as a nano-kernel). Then, the firewall program 102 running on the first operating system checks whether the access is valid or not (step 601). If this check finds that the access is unauthorized, the access is rejected (step 602) and the program enters the wait state where it waits for a new access (step 615).

When on the other hand the access is found valid, received data is stored in the shared memory 106A (step 603) and the control is transferred to the nano-kernel 105 (step 604). Next, the nano-kernel 105, upon receiving the control, passes the control to the virus check program 103 as by interrupt (step 605). The virus check program 103 performs a virus check on the mail data stored in the shared memory 106A (step 606). If the mail data is found to be infected with a virus, the entire mail is discarded (step 612) and the program enters again into the wait state where it waits for a new access (step 615). A check is also made to see if the mail has an attached file (step 607). If so, the attached file is opened and, if it is an executable file, executed (step 608) and a check is made on a result of opening or executing the attached file (step 609).

Here, it is checked whether any unauthorized file access to the disk unit 109 or any unauthorized memory access occurs. If an unauthorized access should occur, only the second system 103 that is operating the virus check program is damaged and the third system or user system 104, the system to be protected, is free from any damage. Then, the mail in question is discarded (step 613) and the viruswall 103 of the second system is erased before being loaded again and restarted (step 614). After this, the program enters a wait state where it waits for a new access (step 615).

If no appended file is found by the check on the presence or absence of an attachment (step 607) or if no anomaly is found by the check on the operation of the appended file (step 609), the control is transferred to the nano-kernel 105 (step 610), which in turn informs the user system 104 operating as the third system that a mail has been received (step 611). In this case, data is transferred through the shared memory 106A. The user system 104 notifies the user client terminal (e.g., 111), through the LAN board 110 for internal LAN, of an arrival of a mail (step 616) and then enters into a wait state where it waits for a new access from outside (step 615). While in this embodiment the external access LAN 107 and the internal access LAN 110 have been described as being separate from each other, they may be formed as an integral LAN.

Figure 4:
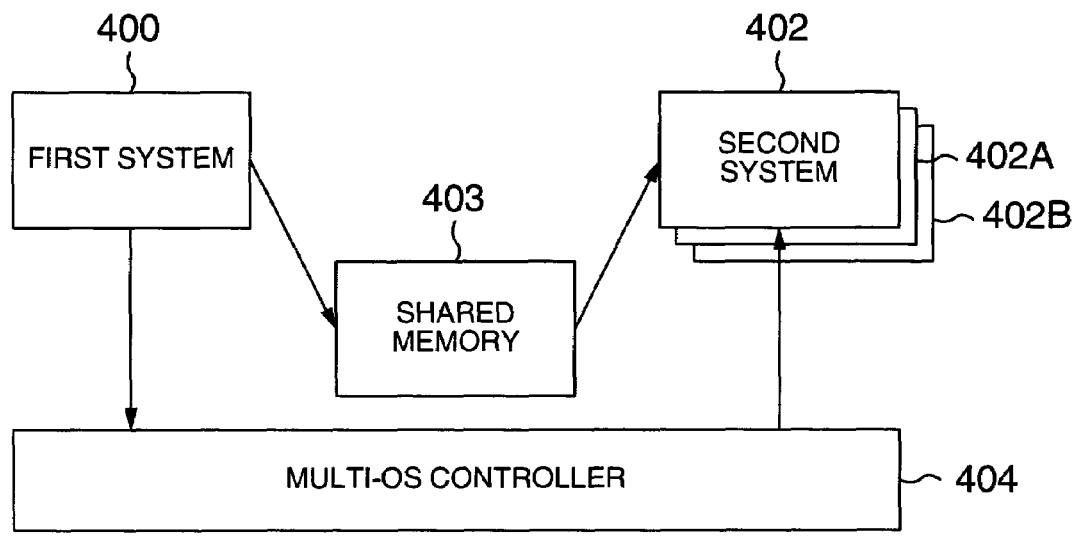
FIG. 4 illustrates a data transfer between a first system and a second system in FIG. 1.

FIG. 4 shows how data is transferred between the first system and the second system in the information processing device 101 of FIG. 1. Next, a data transfer between two systems and their control will be explained by referring to FIG. 4. When the number of systems is three or more, the processing between each of the systems is similarly performed. Data processed by a first system 400 is stored in a shared memory 403 that is accessible also from a second system 402. The first system 400 sends an interrupt to a multi-OS control program 404 (nano-kernel) to inform it that the data is stored in the shared memory 403. The nano-kernel 404 sends an interrupt to the second system 402 as if the interrupt was issued from the LAN board. Next, the second system 402 reads the content of the shared memory 403 as the data from the LAN board and processes it. The second system 402 is the viruswall system of FIG. 1 and there may be two or more second systems, such as 402A and 402B, as shown. In this case, too, an interrupt is issued in the same way as described above.

Figure 5:
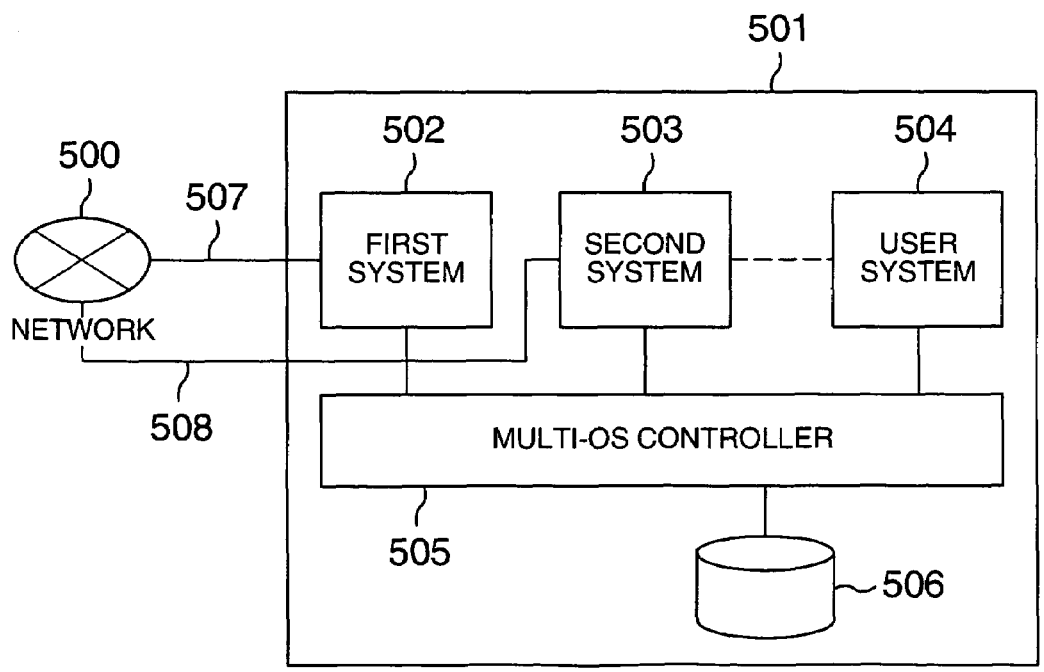
FIG. 5 shows an example system configuration covering an external network and a user system in FIG. 1.

FIG. 5 shows a system configuration when multiple layers of check system are inserted between an external network 500 and a user system. FIG. 7 is a flow chart of operations performed when the system is port scan-attacked from the external network. In the system configuration of FIG. 5, the operation performed when there is an unauthorized access (port scan) from the external network 500 will be explained by referring to the flow of FIG. 7. In a wait state where the check system is waiting for a new access from outside (step 705), when there is an access from outside through a logical access path 507 (step 700), a first system 502 detects that it is being port-scanned (step 701) and a multi-OS control program 505 (nano-kernel) lowers an execution priority level of the first system to the lowest (step 702) to prevent a degradation of executability of other systems.

Further, the nano-kernel 505 starts a second system 503, builds a logical access path 508 to and from the outside to secure a communication path with the outside and builds a firewall on this path (step 703). With the communication path established, a communication with the outside becomes possible (step 704) and the check system enters into a wait state where it waits for a new access from the outside (step 705). In this way, a dummy system is shown to the outside as a target for the unauthorized access to attack. This makes it possible to build a system which, while being attacked by an unauthorized access from the outside, can prevent the actual system operation from being affected by the attack.

Converting the processing shown in the flow charts of FIG. 6 and FIG. 7 into programs and storing them in storage media such as CD-ROM can facilitate an implementation of the present invention. That is, by loading the recorded media into an information processing device connected to a network, the programs can be installed and executed easily in the information processing device.

Figure 2:
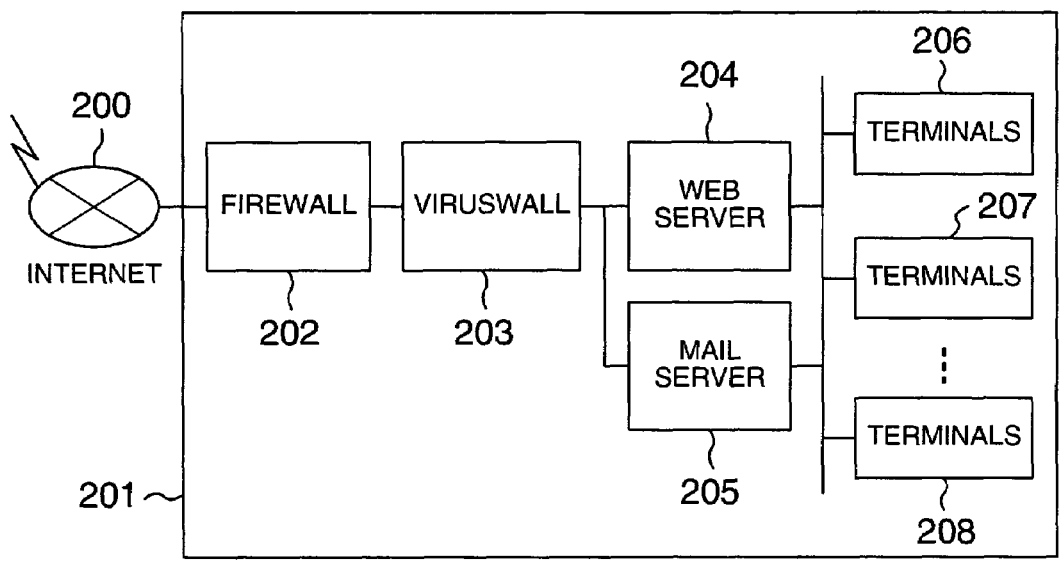
FIG. 2 is a schematic diagram showing a configuration of a corporate network using conventional technologies.
Figure 3:
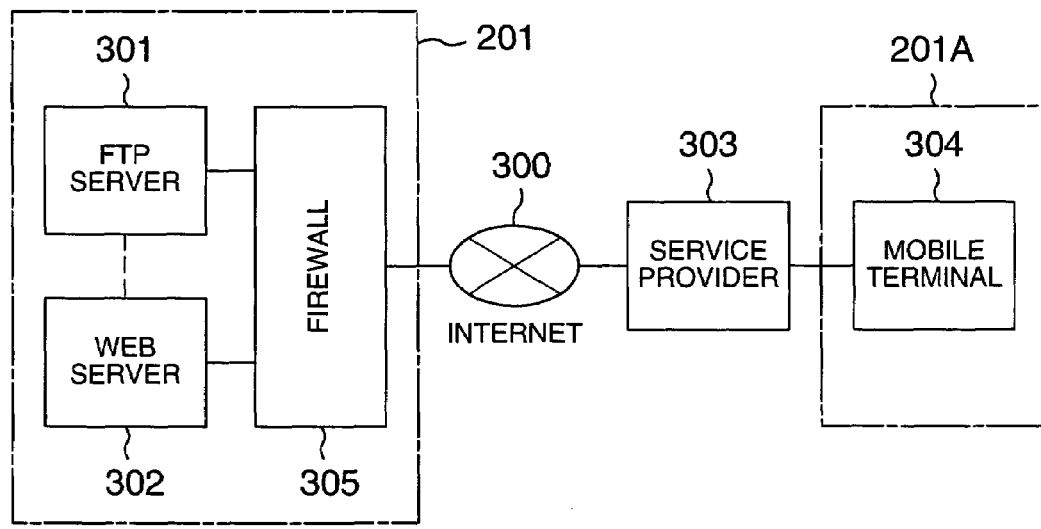
FIG. 3 is a schematic diagram showing how a mobile terminal is connected to a network using conventional technologies.

Applying the information processing device 101 of FIG. 1 to the mobile terminal 304 of FIG. 3 can build a robust security system on the mobile terminal. Further, in FIG. 2, applying this invention to the Web server 204 and the mail server 205 can obviate the firewall server 202 and the viruswall server 203 of the front end. In FIG. 5, by increasing the number of check systems 503 to be put into operation, it is possible to build a robust security system which, even if the security of the first system 502 should be broken by an attack that takes advantage of a weak point of a particular system, can check the unauthorized access by the subsequent systems 503.

As described above, with this invention, since a firewall, a viruswall and a user system can be operated on one and the same hardware, there is no need to install firewall-dedicated hardware or viruswall-dedicated hardware, minimizing a redundant investment of hardware. Further, in mobile terminals, this invention eliminates the need for dedicated hardware and allows security walls such as a firewall and a viruswall to be built easily.

Since a plurality of LAN segments can be realized on one and the same hardware, a plurality of systems can be run independently at the same time. This means that if a first stage of security wall should be broken from outside, only that system whose security was broken is vulnerable to attacks and the user system that is situated behind the broken security wall is free of any damage. The more security walls in front of the user system, the stronger the security of the system will be.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A security wall system for a network device connected to a network comprising:
   a firewall system for protecting a security of an information processing device from the network;
   a viruswall system for performing a virus check on data from the network;
   a network system;
   a multi-OS controller for controlling the firewall system, the viruswall system and the network system so that they can be executed on independent operating systems; and
   a shared memory managed by the multi-OS controller and shared by the operating systems,
   wherein the firewall system, the viruswall system and the network system communicate network data to each other through the shared memory, and
   wherein when the firewall system detects a port scan from the network, the multi-OS controller lowers an execution priority level of the firewall system to the lowest level, starts another firewall system and generates another network path.

2. A security wall system for a network device connected to a network, comprising:
   a firewall system for protecting a security of an information processing device from the network;
   a viruswall system for performing a virus check on data from the network;
   a network system;
   a multi-OS controller for controlling the firewall system, the viruswall system and the network system so that they can be executed on independent operating systems; and
   a shared memory managed by the multi-OS controller and shared by the operating systems;
   wherein the firewall system, the viruswall system and the network system communicate network data to each other through the shared memory, and
   wherein the viruswall system checks for any unauthorized operation by the data received from the network and, when the viruswall system detects an unauthorized operation, the multi-OS controller reloads the viruswall system and the operating system on which to run the viruswall system.

3. A security wall control method for an information processing device connected to a network, comprising:
   a step by a firewall system of checking an access from the network, determining whether the access is an authorized one or not and, when the access is found to be normal, transferring network data to a viruswall system;
   a step by a multi-OS controller of relaying the network data from the firewall system to the viruswall system;
   a step by the viruswall system of receiving the network data from the firewall system, performing a security check on the network data and, when the network data is found to be normal, transferring the network data to a network system;
   a step by the multi-OS controller of relaying the network data from the viruswall system to the network system;
   a step of lowering an execution priority level of the firewall system to the lowest level when the firewall system detects a port scan from the network; and
   a step of starting another firewall system and generating another network path.

4. A security wall control method for an information processing device connected to a network, comprising:
   a step by a firewall system of checking an access from the network, determining whether the access is an authorized one or not and, when the access Is found to be normal transferring network data to a viruswall system;
   a step by a multi-OS controller of relaying the network data from the firewall system to the viruswall system;
   a step by the viruswall system of receiving the network data from the firewall system, performing a security check on the network data and, when the network data is found to be normal, transferring the network data to a network system;
   a step by the multi-OS controller of relaying the network data from the viruswall system to the network system; and
   a step of, when the viruswall system detects an unauthorized operation by the network data received from the network, reloading the viruswall system and an operating system on which to execute the viruswall system.

* * * * *